Sept. 21, 1948. McSHERRY LUPTON 2,449,611
ENDLESS CONVEYER FOR FRUIT GRADING MACHINES
Filed Dec. 6, 1945 2 Sheets-Sheet 1
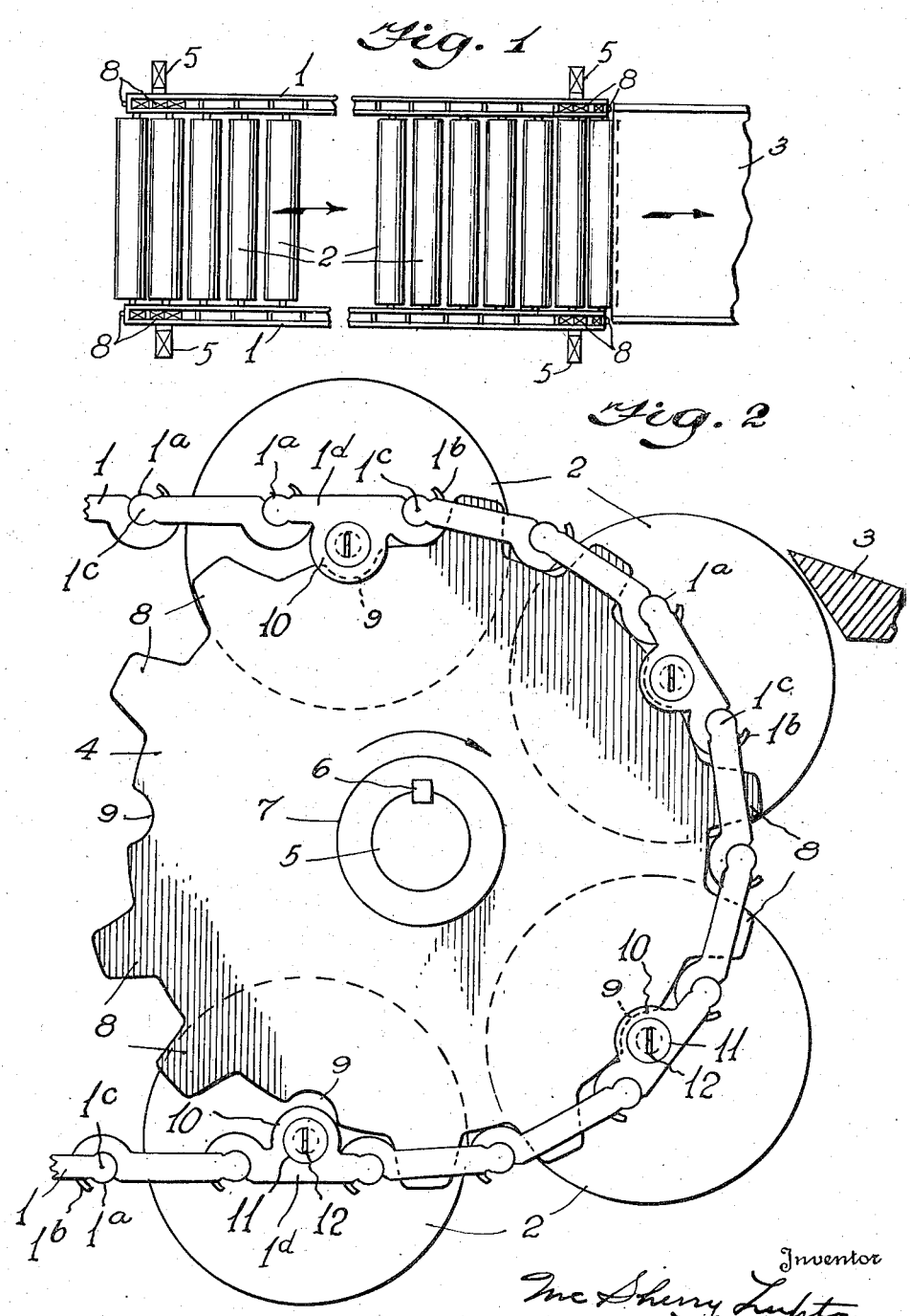

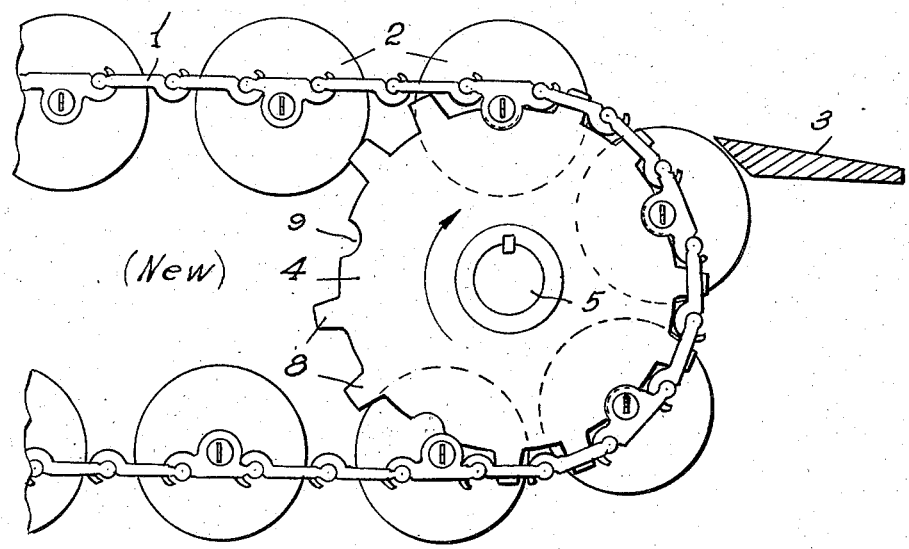

Patented Sept. 21, 1948

2,449,611

UNITED STATES PATENT OFFICE 2,449,611

ENDLESS CONVEYER FOR FRUIT GRADING MACHINES

McSherry Lupton, Winchester, Va.

Application December 6, 1945, Serial No. 633,144

6 Claims. (Cl. 198—183)

This invention relates to roller type endless conveyors and pertains particularly to such conveyors, as used in machines for grading fruit.

In the grading of fruit for size, apples, for example, machines have been used which receive and sort thousands of bushels of apples per day. Some of the conveyor equipment thereof is used to initially carry the fruit away from the receiving station and one such machine includes an endless conveyor in the nature of an endless assembly of rollers supported by spaced endless chains in the form of closed loops. Such rollers are positioned close together during most of their travel. Such an endless assembly of chains and rollers is illustrated in Fig. 1 of the Patent No. 2,406,842.

According to practice prior to this invention, considerable loss of fruit was sustained due to a construction which is briefly identified as follows. According to that obsolete equipment, as the rollers pass around the sprocket wheels on which the chains are supported, the space between the rollers increased; the fruit was damaged in the widened gap between the rollers; and other fruit was injured by the fall sustained when the fruit was discharged from the rollers while passing over the sprocket wheel to the apron which conducts the fruit to the next grading station. The distance between the discharge level and the apron was substantial, being located about midway of the height of the sprocket wheel, because the apron could not be placed at a higher level on account of the wide gap between the rollers and also because of the large circumference marking the outer path of the perimeter of the rollers.

The chain which was used in such prior installations was provided with lugs which protruded outwardly from the chain. The lugs are provided with journals for the reception of rods or axles on which the rollers were mounted. That type of chain was used on a sprocket wheel of substantially conventional contour in that the full number of teeth were present to drive the chain. Sometimes it was necessary to shorten certain teeth so that the roller axles could pass over the ends of the teeth. However, as outlined in the foregoing, this type of equipment unavoidably caused the damage of a substantial amount of fruit.

The present invention provides an improvement which largely eliminates the foregoing mentioned loss of fruit. The construction which is responsible for the improvement includes the usual rollers and drive chains. However, whereas according to the prior practice the gap between the rollers in their passage around the sprocket wheel increased, according to the present improvement no such widening of the gap occurs. With the use of this improved construction a substantial saving in fruit is effected.

More specifically, the construction which is responsible for this saving is due to the shape of the endless drive chains and to the relation between the respective drive chains and their cooperating sprocket wheels of a particular contour. According to this arrangement the lugs carried by the chains and which provide journals for the axles of the rollers are positioned on the inside of the chain; in other words within the closed loops and on the side of the chain next adjacent the sprocket wheel, as contrasted to the previous form in which the lugs projected outwardly on the side of the chain opposite from the sprocket wheel. The position of the lugs with respect to the line connecting the pivotal centers of the links may be described also by comparison with the stretches of the chain between the sprocket wheels at its opposite ends. Thus, in the operative position of a single chain, the lugs and the journal openings in each lug which are at any time disposed along the horizontal stretches of a chain are between the upper and lower stretches. This positioning of the lugs on the inner side of the chain requires corresponding modification of the sprocket wheel. This is done by removing certain of the sprocket gear teeth and providing a recess extending radially inwardly at the same spot circumferentially from which the teeth formerly projected. Thus the particular sprocket wheel of this invention displays an interrupted series of gear teeth, in as much as at regular intervals the perimeter of the sprocket wheel has a series of inwardly extending notches. The lugs fit into those notches, and the notches constitute recesses for the reception of the lugs, while the chain is moving around the sprocket wheel.

The above and additional features and advantages of this invention will be understood from the following specification and claims and from the accompanying drawings in which—

Fig. 1 represents a reduced top plan view of a portion of a conveyor, showing a series of rollers mounted in two spaced chains and in position to discharge fruit onto an apron or platform, the end portions with sprocket wheels and the axles therefor being shown but the intermediate portion being broken away.

Fig. 2 is an enlarged end view of the side of one of the sprocket wheels showing the position of the chain and rollers with respect to the sprocket wheel and also the position of the adjacent edge of a discharge apron;

Fig. 3 is a reduced view of the same assembly shown in Fig. 2; and

Fig. 4 is a view similar to that shown in Fig. 3, but illustrating the type of construction in use prior to the present invention.

Referring in detail to the drawings, the endless conveyor chains have links 1. There are two of such chains and between them are positioned a series of long, narrow rollers 2 which are sufficiently close together to serve as an endless conveyor for fruit or other objects being moved. As shown in the several figures, the rollers are adapted to dump or unload their load of fruit onto a platform or discharge apron 3, one edge of which is positioned as close as possible to the path of movement of the rollers during the time they pass over sprocket wheels 4.

In Fig. 2 there is illustrated in side elevation one of the two sprocket wheels 4 mounted on a drive shaft 5 and secured to the shaft by a key 6 which fits into grooves or slots in the shaft 5 and the hub 7 of the sprocket wheel 4. 8 indicates the gear teeth on the sprocket wheel. It will be observed that in the particular shape of sprocket wheel illustrated in Figs. 2 and 3 there are shown a series of pairs of teeth 8 and between each pair is an inwardly extending recess or notch 9 which is positioned at the exact point circumferentially on the sprocket wheel 4 at which otherwise would have been located one of the usual gear teeth.

The chain adapted to co-operate with this type of sprocket wheel includes spaced pairs of conventional links 1 and between each pair there is a special link 1d which carries the inwardly extending lug 10 providing journal bearings for the ends of the roller axles which will be described. Referring more particularly to the structural details of the chain, the side view of several links of conventional shape are indicated at 1. At one end of each link is a ball 1a which is adapted to be seated in a socket having an arm 1b which is adapted to partially encircle the ball 1a. The pivotal center of the opposite ends of each link is indicated at 1c. The points 1c are identified chiefly for the purpose of determining the center line of the chain, so that the position or location of the lugs may be determined with respect to that line.

According to this improvement, the lugs 10 are located on the inside of the chain or, in other words, on the side of the chain next adjacent the sprocket wheel. Thus, the lugs 10 lie entirely on that side of the line 1c—1c of the link which carries the lug. Each lug has an opening 11 therethrough extending parallel to the axial line of the shaft 5 and the pulley 4, and which opening 11 serves as a journal bearing for the reception of the axles 2a of the rollers 2. To prevent the axles 2a and the rollers 2 from shifting endwise in the bearings 11 and to help position the rollers centrally between the chains 1, each lug carries a locking element 12 which is secured in the outer end of the bearing 11 and is fastened to the wall of that opening by suitable means, as for example screw threads, not illustrated. These fastening elements are conventional.

In the arrangement as shown in Figs. 2 and 3, it will be observed that the rollers are brought quite closely together during the time that that portion of the chain which carries them is passing around the sprocket wheel 4. In that relation, the take off board or discharge apron 3 is positioned well above the axis of the sprocket wheel and substantially opposite the upper side of the sprocket wheel. It will be observed that the valley or space between the two rollers on the upper side of the sprocket wheel is relatively shallow and the walls of the groove formed by the side of the rollers are far apart, whereas the rollers on the side next to the sprocket axle are close together and the valley between the two rollers is sharp and deep.

Comparing the structure shown in Figs. 3 and 4, Fig. 3, like Fig. 2 represents the present improved form, and Fig. 4 illustrates the old type of equipment. It will be observed that Fig. 4, in contrast to Fig. 3, shows the presence of a deep valley between the uppermost roller directly above the sprocket axle and the next roller on the discharge side of the chain. As explained hereinbefore, damage to fruit, apples for example, has been caused by the depth of the valley between these last two mentioned rollers.

In prior practice and with the use of a machine having such equipment as is illustrated in Fig. 4, there has been a tendency for the fruit to be caught between the oncoming roller as the fruit is discharged over the curve onto the discharge apron or take off board 3, unless the board was relatively low so that the fruit might move away and out of the path of the roller. Further, by comparing the structure shown in Figs. 3 and 4, it will be noted that the space between the rollers in Fig. 3 is much less than that in Fig. 4 and also that it is possible, because of the different path of travel of the rollers, to locate the take off board 3 at a much higher level. This avoids the bruising of fruit such as took place by requiring it to fall to the level of the take off board according to the old form, as shown in Fig. 4.

I claim:

1. In an endless conveyor assembly having two spaced chains and a conveyor surface of a plurality of rollers carried by and between said chains, axles extending beyond the ends of each roller, each of said chains comprising a closed loop of a plurality of interconnected links, certain of said links having lugs located on that side thereof within the loop of said chains, and said lugs having journal bearings at right angles to the plane of the respective chains, said roller axles being mounted in said journal bearings whereby the conveyor surface is composed of a plurality of parallel rollers.

2. In an endless conveyor assembly having two spaced endless chains and a conveyor surface of a plurality of rollers carried by and between said chains providing upper and lower stretches, roller axles extending beyond the ends of each roller, each of said chains comprising a plurality of pivotally interconnected links, certain of said links having lugs with journal openings therethrough, the axial center of each of which openings is between the upper and lower stretches of its respective chain as regards a line drawn between the pivotal centers of the opposite ends of each respective link, said roller axles being mounted in said journal openings, whereby the conveyor surface is composed of a plurality of parallel rollers.

3. In an endless conveyor assembly having two spaced chains, a conveyor surface of a plurality of rollers carried by and between said chains, and two sprocket wheels on a common axle within said chains and on which said chains are mounted, axles extending beyond the ends of each roller, each of said chains comprising a closed loop of a plurality of interconnected links, certain of said links having lugs located on that side thereof within the loop of said chains and said lugs having journal openings extending at right angles to the plane of the respective chains, said roller axles being mounted in said journal openings, each of said sprocket wheels having teeth extending radially outwardly and engaging said chains, and said wheels being characterized by the presence of a series of notches in the periphery and into which notches said lugs are adapted to be nested as the wheel rotates and the chain links engage it.

4. In an endless conveyor assembly having two spaced chains, a conveyor surface of a plurality of rollers carried by and between said chains, and two sprocket wheels on a common axle within said chains and on which said chains are mounted, axles extending beyond the ends of each roller, each of said chains comprising a closed loop of a plurality of interconnected links, certain of said links having lugs located on that side thereof within the loop of said chains and said lugs having journal openings extending at right angles to the plane of the respective chains, said roller axles being mounted in said journal openings, each of said sprocket wheels having teeth extending radially outwardly and engaging said chains, and said wheels being characterized by the absence of a gear tooth and the presence of an inwardly extending notch between certain adjacent gear teeth and into which notches said lugs are adapted to be nested as the wheel rotates and the chain links engage it.

5. In an endless conveyor assembly having two spaced chains, a conveyor surface of a plurality of rollers carried by and between said chains, and two sprocket wheels on a common axle within said chains and on which said chains are mounted, axles extending beyond the ends of each roller, each of said chains comprising a closed loop of a plurality of interconnected links, certain of said links having lugs located on that side thereof within the loop of said chains and said lugs having journal openings extending at right angles to the plane of the respective chains, said roller axles being mounted in said journal openings, each of said sprocket wheels having teeth extending radially outwardly and engaging said chains, and said wheels being characterized by the absence of a gear tooth and the presence of an inwardly extending notch between certain adjacent gear teeth and into which notches said lugs are adapted to be nested as the wheel rotates and the chain links engage it, said notches extending centrally inwardly of the circle passing through the bases of the gear teeth.

6. In an endless conveyor assembly having two spaced chains and a conveyor surface of a plurality of rollers carried by and between said chains, each of said chains comprising a closed loop of a plurality of interconnected links, certain of said links having lugs located on that side thereof within the loop of said chains, and means extending between said lugs and the end portions of each of said rollers, said means serving as a mounting on the lugs for each respective roller whereby the roller is rotatable with respect to its associated lugs.

McSHERRY LUPTON.